United States Patent [19]

Dorschner

[11] Patent Number: 4,525,028
[45] Date of Patent: Jun. 25, 1985

[54] ENHANCED MAGNETIC MIRROR

[75] Inventor: Terry A. Dorschner, Newton Center, Mass.

[73] Assignee: Raytheon Company, Lexington, Mass.

[21] Appl. No.: 608,925

[22] Filed: May 11, 1984

Related U.S. Application Data

[63] Continuation of Ser. No. 257,304, Apr. 23, 1981.

[51] Int. Cl.³ .................................................. G01B 9/02
[52] U.S. Cl. ..................... 350/377; 356/350; 356/351
[58] Field of Search ................. 356/350, 351; 350/377

[56] References Cited

U.S. PATENT DOCUMENTS 3,418,483  12/1968  Fan ....................................... 350/377
3,851,973  12/1975  Macek .............................. 356/106 LR
3,927,946  12/1975  McClure ......................... 356/106 LR

OTHER PUBLICATIONS

Krebs et al. "Applications of Magneto-Optics in Ring Laser Gyroscopes", IEEE Transactions on Magnetics, Vol. Mag-16, No. 5, (Sep. 1980), pp. 1179-1184.
"A Manganese Bismuth Magnetic Mirror for the Raytheon Laser Gyroscope", T. A. Dorschner, et al., Proc. 1978 IEEE Nat. Aero & Electr. Conf. (IEEE, New York, 1978), pp. 569-573.
"Manganese Bismuth Magnetic Mirrors" by T. A. Dorschner, 1980 Digests of the International Magnetics Conference, Apr. 21-24, 1980.

Primary Examiner—R. A. Rosenberger
Attorney, Agent, or Firm—Richard M. Sharkansky; Joseph D. Pannone

[57] ABSTRACT

A magnetic mirror for producing enhanced circular birefringence comprises a thin, semi-transparent film of magneto-optical material deposited on a reflective substrate and having a mangetic field perpendicular to the plane of the film. The magneto-optical film is overcoated with a multilayer dielectric stack to increase the reflectivity of the mirror and thereby reduce the overall loss. The magneto-Kerr rotation resulting upon reflection from the top surface of the magnetic film is enhanced by the Faraday rotation obtained via multiple relections in the magnetic film. Preferably, the magnetic mirror has an overall reflectivity of 99%, making it suitable for use as the nonreciprocal bias element in a ring laser gyro, and the magneto-optical film comprises a layer of MnBi.

16 Claims, 9 Drawing Figures

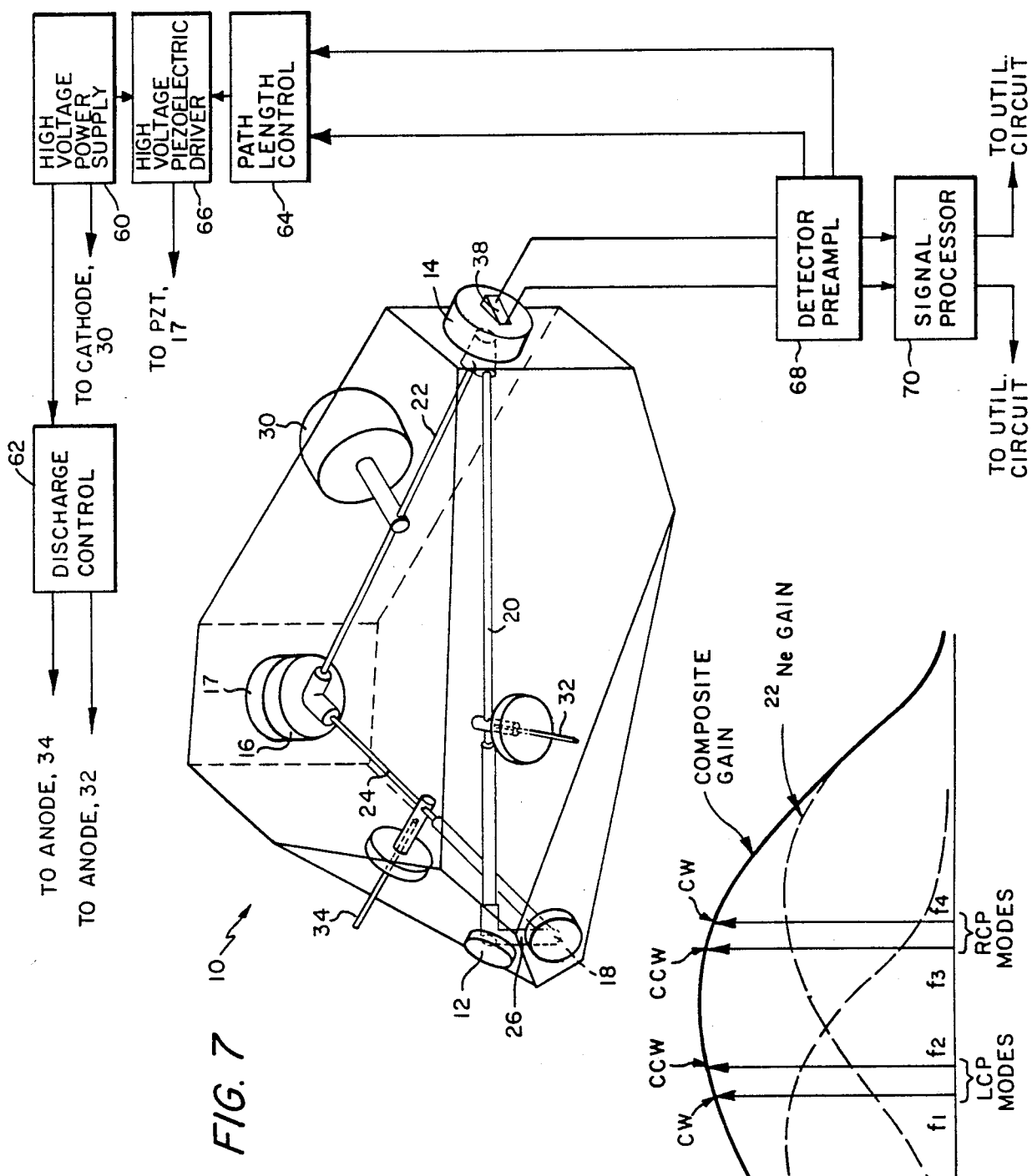

ENHANCED MAGNETIC MIRROR

The Government has rights in this invention pursuant to Contract No. F33615-78-C-1526 awarded by the Department of the Air Force.

Continuation of Ser. No. 257,304, Apr. 23, 1981.

BACKGROUND OF THE INVENTION

Laser gyroscopes utilizing four frequencies to avoid locking of waves traveling in opposite directions around a laser gyro ring resonator path have been built of the type shown, for example, in U.S. Pat. Nos. 3,741,657 and 3,854,819 by Andringa. It has been found that such gyroscopes can exhibit thermal drift in the apparent output due to the relative motion of scattering centers on or in optiical components of the laser gyro resonator. In the case of these patents, the scattering centers are mainly the surfaces of any solid element, such as used for magnetic bias. Attempts to replace Faraday rotation units in the path of the laser by a magnetic mirror have heretofore been unsatisfactory due to the high losses in the magnetic mirrors. Such a mirror shown, for example, in U.S. Pat. No. 3,851,973 is undesirable due to the very large absorption of light waves incident on the mirror. In addition, such a system utilizes the transverse Kerr magneto-optic effect which gives rise to nonreciprocal phase shifts only for linearly polarized components, and thus is not suitable for gyro systems employing circulary polarized waves.

SUMMARY OF THE INVENTION

This invention provides for a magnetic mirror comprising a substrate, means for producing a predetermined amount of reflectivity disposed on a surface of the substrate, a thin, semi-transparent layer of magneto-optical material disposed over the reflectivity producing means, and means for enhancing the reflectivity of the top surface of the magneto-optical layer. Preferably, in a first embodiment, the reflectivity producing means comprise a multiple layer dielectric stack deposited on the substrate. In a second embodiment, the reflectivity producing means comprise a metal layer disposed over the substrate and a plurality of alternating dielectric layer pairs disposed over the metal layer. The reflectivity enhancing means may also comprise a multiple layer dielectric stack.

The invention also teaches that the magneto-optical layer of the magnetic mirror comprises a thin film having an optical thickness of less than a quarter wave and that the magnetic mirror further comprises means for increasing the apparent optical thickness of the thin film. Preferably, the thickness increasing means are incorporated into a dielectric stack that forms the reflectivity producing means.

The invention further teaches that the magnetic mirror may further comprise means for compensating for the excess phase shift upon reflection from the magneto-optical layer and that, preferably, the compensating means are incorporated into a dielectric stack that forms the reflectivity enhancing means on the top surface of the magneto-optical layer.

BRIEF DESCRIPTION OF THE DRAWINGS

Other and further objects and advantages of the invention will be apparent as a description thereof progresses, reference being had to the accompanying drawings wherein:

FIG. 2 illustrates the laser gain characteristics of a four-frequency ring laser system;

FIG. 7 illustrates a partly diagrammatic view of a ring resonator using the magnetic mirror of the present invention.

DESCRIPTION OF THE PREFERRED EMBODIMENT

Figure 1A:
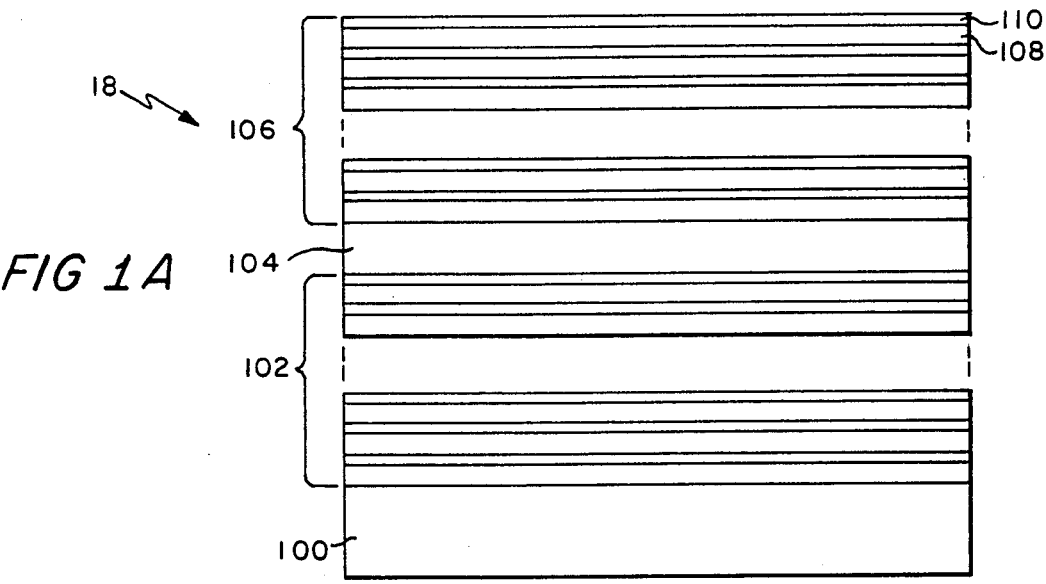
FIG. 1a illustrates a preferred embodiment of the magnetic mirror of the present invention.

Referring first to FIG. 1a, there is shown a magnetic mirror 18 of the present invention. A substrate 100 supports a reflecting undercoating comprising multiple-layer dielectric (MLD) stack 102. A thin film 104 of manganese bismuth (MnBi) is disposed over MLD stack 102, and in turn an overcoating comprising a second MLD stack 106 is disposed over the thin film MnBi. This results in the magneto-optical layer 104 of MnBi to be sandwiched between the two dielectric stacks. The MLD stacks 102 and 106 are made up of alternating layers 108 and 110 of material having respectively low and high indices of refraction in order to result in a high reflectivity MLD mirror as is well known in the art.

Figure 1B:
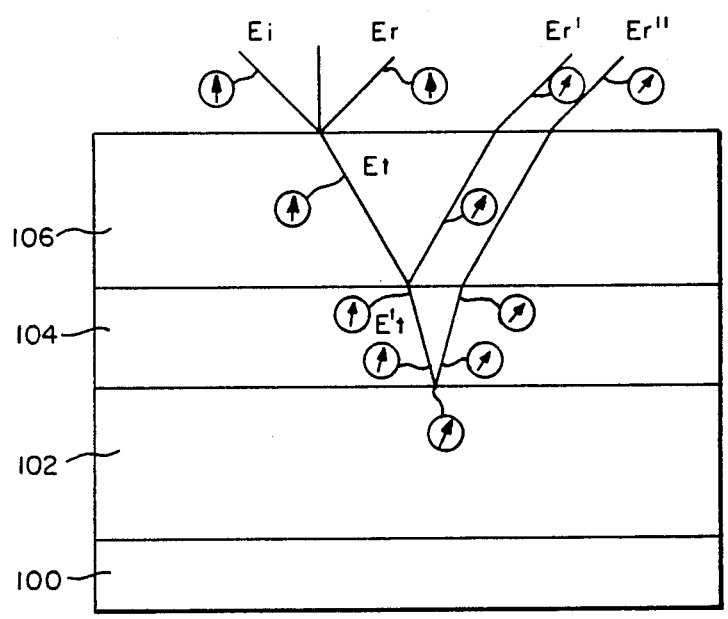
FIG. 1b is a simplified diagram of the magnetic mirror of FIG. 1a and illustrates the directions and rotations of the relevant transmitted and reflected portions of a linearly polarized incident wave.

A polished ferromagnet such as the layer of MnBi exhibits magneto-optical properties which might be useful in producing the nonreciprocal bias required by laser gyros. Unfortunately, only about 40–60% of an incidence wave is reflected from ferromagnets at optical wavelengths; the remainder is absorbed. Such high losses preclude direct use of such materials in a laser gyro. A multilayer dielectric stack 106 positioned over the magnetic substrate can be used to enhance its reflectivity to acceptable levels of approximately 99%. This is required by the low gain available at the 633 nm visible transition of the He-Ne gain medium used in many laser gyros. Enhancing the reflectivity with the dielectric overcoating results in only a small portion of the incidence light being transmitted to the magnetic film, thereby reducing the net absorption. The net rotation is also reduced by the overlying stack since, of the fractional component reaching the magnetic film and undergoing rotation, only a portion of this is retransmitted back into the cavity; the rest is absorbed in the magnetic film. The net rotation of the incident wave is then given by the vector sum of the highly attenuated rotated component and the essentially unattenuated primary reflected component. This may be better understood with reference to a portion of FIG. 1b. For simplicity, MLD stack 106 is shown as a single equivalent dielectric layer which reflects a portion $E_r$ of a linearly polarized incident wave $E_i$, while allowing a component $E_t$ to be transmitted through. The plane of polarization of the various waves is represented by the encircled vector shown adjacent various positions along the waves. The primary reflected wave $E_r$ is shown as receiving no rotation upon reflection from the isotropic MLD stack 106. A portion of the transmitted wave $E_t$ is reflected at the upper interface of the anisotropic magnetic film 104 which imparts a first predetermined amount of rotation due to the polar Kerr effect, as shown by the corresponding rotated vector, and results in an external resultant reflected component $E_r'$ after suitable multiple reflections in 106, which are not shown. Rotation is here the result of differential phase shift or circular birefringence, that is, the difference in phase shift between waves of left-hand circular polarization (LCP) and right-hand (RCP) circular polarization. A similar analysis applies to a second linearly polarized incident wave having a plane of polarization orthogonal to the first one. Linear superposition of these two orthogonal linearly polarized waves leads to the solution for an incident wave having circular polarization which is the polarization of interest.

The active layer 104 has a magnetization which is normal to the plane of the mirror. Using this polar magneto-Kerr configuration the magnetic mirror is operationally equivalent to the Faraday rotator; it is just the reflection analog. In this case, the reflection coefficients, rather than the transmission coefficients, for modes of the same circular polarization handedness but propagating in opposite directions can be shown to differ in phase, thereby, giving rise to a splitting of the resonance modes, analogously to the case of the intracavity Faraday rotator.

A useful figure merit for a magnetic mirror is the net rotation divided by the total loss. The total loss is just unity less the intensity reflectivity and includes the scatter, absorption and transmission losses in the mirror. Practical units are minutes of rotation per percentage of loss. A magnetic mirror employing a magnetic substrate having a dielectric overcoating has an adequate figure of merit, i.e., it produces a sufficiently large net rotation at sufficiently low loss to be useful in laser gyros.

The magnetic mirror of the present invention further improves the figure of merit achievable. This is done by making the magnetic layer 104, which is sandwiched between the two dielectric stacks 102 and 106, sufficiently thin to be semi-transparent. Under this condition, and referring again to FIG. 1b, wave $E_t'$ transmitted into the magnetic layer is not entirely absorbed and a portion of it is recovered via reflection from dielectric undercoating 102, also shown as a single equivalent dielectric layer for simplicity. A portion of $E_t'$ is reflected at the lower magnetic interface and gives rise to reflected wave component $E_r''$ which is transmitted back into the cavity. Thus, the reflected component $E_r'$ from the magnetic mirror of the present invention receives a predetermined amount of polar Kerr rotation upon reflection from the top surface of the magnetic layer 104, while the transmitted component $E_t'$ receives a predetermined amount of Faraday rotation upon transmission through the layer. The transmitted wave $E_t'$ further receives a second predetermined amount of polar Kerr rotation upon reflection from the lower surface of the magnetic layer. This wave gives rise to reflected component $E_r''$ which additionally receives a second Faraday rotation upon transmission through the magnetic layer in the reflected direction as shown by additionally rotated vector. Additional multiple reflections do occur in the magnetic film 104, but are here considered to be incorporated into reflected component $E_r''$ for simplicity. In most ferromagnetic films, the attenuation is sufficiently high that only the first transmitted component has appreciable amplitude after a double pass through even a thin film. The two additional Faraday rotations are large enough to enhance the overall rotation since the net rotation is again the result of the vector sums of all the individual reflected components $E_r$, $E_r'$ and $E_r''$. This description holds substantially for propagation at small angles of incidence in the MLD stacks. It holds for either s (perpendicular) or p (parallel) linear polarizations, albeit with different coefficients for each due to the Brewster angle effect in each layer. As mentioned above, the effect for circularly polarized waves is just the superposition of two of the orthogonal linearly polarized cases, with one shifted 90° in time phase. It should be noted that even though a certain amount of depolarization does occur as the waves are reflected and transmitted through the MLD layers and the active magnetic layer 104, the depolarized $E_r'$ and $E_r''$ components are much smaller in amplitude than the main component $E_r$ and thus contribute little to the overall depolarization of the return beam. The resultant splitting of the circularly polarized gyro modes is $f_F = f_2 - f_1 = f_4 - f_3 = c\theta/\tau L$ where $\theta$ is the net rotation of the mirror in radians.

A common misinterpretation of the modes of FIG. 2 and of the polar Kerr mirror leads to the misconception that clockwise (cw) and counterclockwise (ccw) modes of a given polarization handedness must undergo differential phase shift at the magnetic mirror. Of course, the symmetry of the polar configuration insures that no such differential phase shift could occur. It must be realized that a diagram such as that of FIG. 2 describes the modes at a given point in the ring. Because the sense of polarization of circularly polarized modes changes upon reflection, the senses shown in FIG. 2 alternate in adjacent legs of the ring. Thus, if one has an LCP mode at a frequency $f_1$ incident on the magnetic mirror in the cw direction, as indicated in FIG. 2, the corresponding ccw traveling mode at $f_2$ must be incident on the mirror from the adjacent leg of the ring and is actually RCP before reflection. The two modes incident on the mirror, i.e., the cw LCP mode and the ccw RCP mode, then have different helicities, and therefore, these counter-traveling modes do undergo a differential phase shift which results in the "Faraday" splitting shown. A similar description applies to the modes at frequencies $f_3$ and $f_4$. The circularly polarized modes of the laser gyro of the present invention favor use of the polar Kerr configuration for which normal modes in the magnetic material are also circularly polarized.

Manganese bismuth is found to be the only material leading to a practical figure of merit for the laser gyro of the type contemplated by the present invention. For a given figure of merit, a performance trade-off must be considered in selecting the amount of nonreciprocal bias in relation to the amount of loss that will result. As mentioned above for the 633 nm transition of He-Ne, it is desirable to restrict the loss to approximately 1%. This leaves a top-surface rotation of about one and one-half minutes resulting in a Faraday bias of about 154 KHz which is sufficient for many reasonable applications of laser gyros. Other combinations of loss and rotation having a substantially similar figure of merit can be achieved by variation of the overlying MLD layer.

Even though under normal operating conditions the non-reciprocal "Faraday" bias splitting determines the maximum rotation rate allowable before lock-in is approached, it is not necessary to restrict operation of the laser gyro to this mode. The gyro is always biased for rotation rates which are large relative to the lock-in range and therefore the non-linearity near lock-in is only a small percentage error on the output rate. Furthermore, only one of the two independent gyros can approach lock-in for a given rotation sense. This allows processing of the remaining unlocked gyro output as a conventional two-frequency gyro for the period of time during which the rotation rate is near the lock-in rate. Since lock-in occurs at relatively large rotation rates, it follows that in many applications its actual occurrence would be relatively infrequent and its duration would generally be of a very short time, during which any drift of the unlocked gyro would be negligible.

The magnetic mirror of the present invention is prepared by growing the MnBi film directly onto an MLD stack. Commercial MLD mirrors composed of both "hard" $TiO_2/SiO_2$ and "soft" $ZnS/ThF_4$ layers are suitable. The deposition process involves depositing a layer of bismuth on the mirror, annealing the bismuth layer, depositing a second layer of manganese and alloying the two layers to form the intermetallic compound MnBi. Orientation of bismuth with the basal plane parallel to the plane of the stack is energetically favorable and occurs for thin films upon annealing for several minutes at temperatures in the range of 120°–200° C. This partial orientation is not disturbed by the subsequent manganese deposition and diffusion, therefore, the resultant film has its c-axis normal to the substrate. Such films are not single crystal since they are randomly oriented in the basal plane. However, the magneto-optical properties require that only the c-axis be everywhere aligned normal to the film. The film can then be permanently magnetized with the remanent magnetization having a substantial component normal to the plane of the film. As long as the Curie temperature of the film is not exceeded, the film will hold the remanent magnetization indefinitely. The following table lists the actual process parameters for one of the films used in the preferred embodiment.

| MnBi Processing Parameters Table | |
|---|---|
| Substrate Bake-out | 200° C. for 1 hour |
| Bismuth Deposition | |
| Deposited Thickness | 704 Å |
| Substrate Temperature | 25° C. |
| Deposition time | 3 Min. 10 Sec. Dep. Rate 307 Å/s |
| Vacuum | Initial: $3 \times 10^{-8}$ Torr |
|  | Final: $2 \times 10^{-7}$ Torr |
| Bismuth Anneal | 140° C. for 30 minutes |
| Manganese Deposition | |
| Deposited Thickness | 245 Å |
| Substrate Temperature | 25° C. |
| Deposition Time | 4 Min. 45 Sec. Dep. Rate 0.86 Å/s |
| Vacuum | Initial: $2.5 \times 10^{-8}$ Torr |
|  | Final: $4 \times 10^{-7}$ Torr |
| Alloy 225° C. for 30 minutes, 250° C. for 30 minutes | |

This resulted in a MnBi film having a thickness of about 1014 Å and 50.1% manganese. The film was later etched to yield various thicknesses to determine experimentally various characteristics as a function of magnetic layer thickness, as discussed below.

The undercoating and overcoating dielectric stacks comprise multiple layers of alternating low and high index of refraction materials having quarter wave optical thickness at the operating frequency and at the selected angle of incidence. Films of $ThF_4$ and $ZnS$ are used in the preferred embodiment, although other films of alternating dielectric materials such as silica $SiO_2$ and titania $TiO_2$ may also be used. It is found that the figure of merit for the magnetic mirror does not vary by more than about ten percent for other material choices for the dielectric overcoating stack and other layer numbers, as long as the combination leads to a high reflectivity composite. Thus, the figure of merit of a magnetic mirror is not affected by the details of the overcoating process. The main requirement for the dielectric stack is then to provide for a specific amount of reflectivity, in a preferred embodiment approximately 99%.

A number of factors must be considered to determine the optical thickness for the magnetic layer. The Faraday rotation is found to increase linearly with thickness, but the contribution from the Faraday and bottom-surface Kerr rotations that is seen at the top surface decreases exponentially with thickness because of the attenuation. The phase shift upon reflection from the bottom surface and the phase shifts due to transmission through the layer must also be accounted for, as well as the fact that the Faraday and Kerr rotations in a lossy medium are complex. More specifically, it is important that all the waves reflected back into the cavity, i.e., $E_r$, $E_r'$ and $E_r''$, be substantially in phase so as to reduce any destructive interference between them. To this end, the MLD overcoating 106 has a quarter wave effective optical thickness to adjust the phase of the $E_r'$ component, and the top layer of MLD undercoating 102 is adjusted to simulate an effective quarter wave optical thickness for the magnetic film 104 to adjust the phase of the $E_r''$ component. This top layer phase adjustment is used to allow use of less than a true quarter wave optical thickness of the magnetic film 104, in order to reduce the loss.

Figure 3:
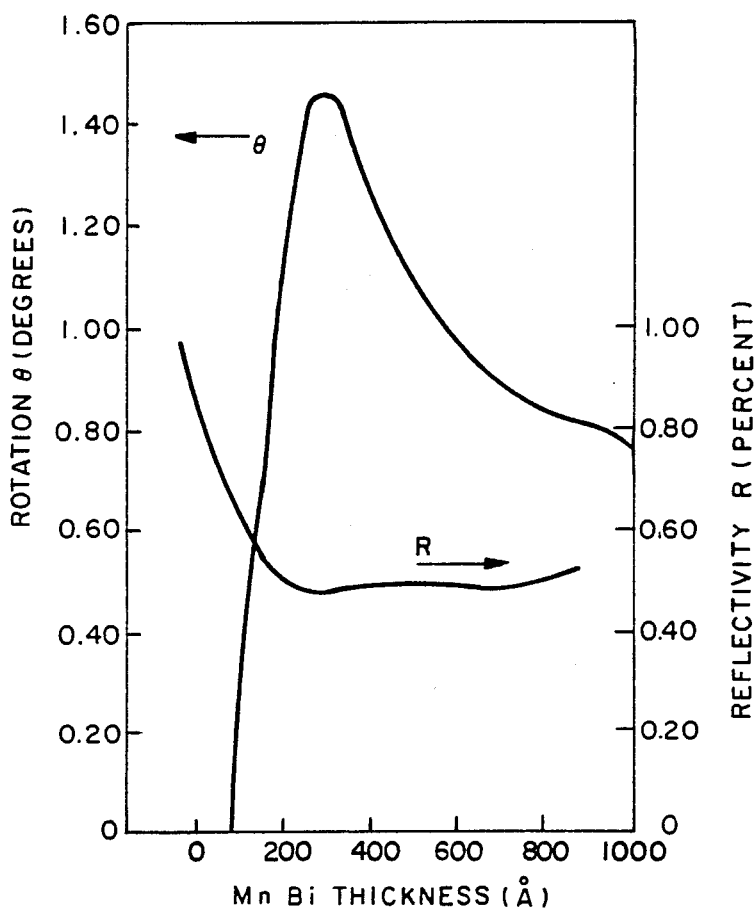
FIG. 3 is a graph of rotation and reflectivity as a function of the thickness of a magnetic film disposed over a reflective undercoating.
Figure 4:
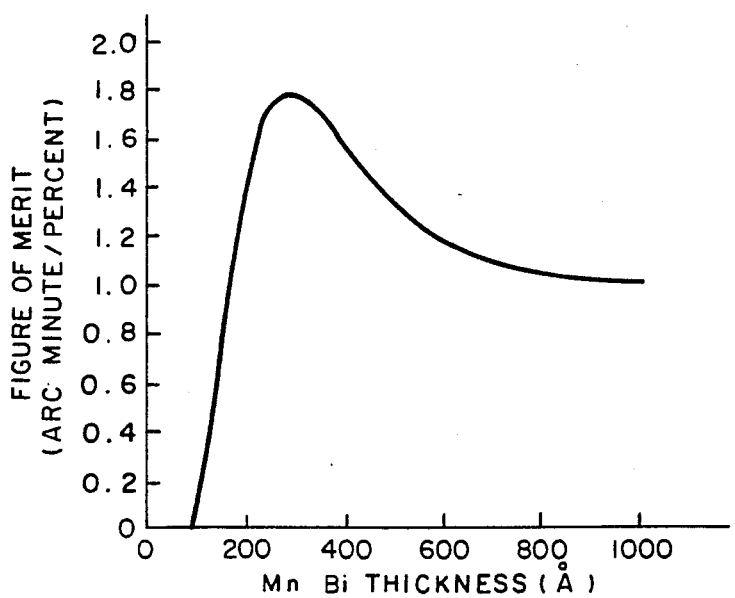
FIG. 4 is a graph of the figure of merit as a function of the thickness of a magnetic film disposed over a reflective undercoating.

FIG. 3 shows the rotation and reflectivity achieved at the front surface of a MnBi film on a soft MLD mirror as a function of the thickness of the MnBi film. The reflectivity is found to be nearly constant for film thickness ranging from about 750 Å to 200 Å. As the thickness decreases further, the reflectivity increases rapidly to the nearly 100 percent reflectivity of the MLD undercoating corresponding to zero magnetic film thickness. The effective magneto-optical rotation is markedly enhanced well before variations in reflectivity are apparent. For very thin layers of film 104, the rotation is effectively zero due to an unavoidable parasitic inactive layer found on the lower portion of manganese bismuth films. The finite size of the measurement beam masks the actual peak, however, the maximum rotation measured occurs near 300 Å thickness and is almost double the initial value for the 1000 Å thick film. This enhancement of the net rotation is obtained at nearly constant reflectivity. FIG. 4 shows the figure of merit as a function of thickness for the same structure as described above.

Figure 5:
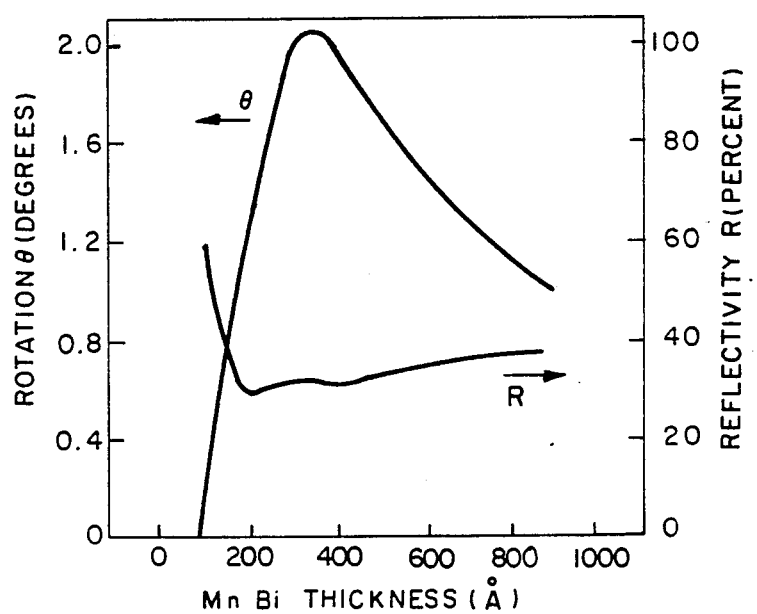
FIG. 5 is a graph of rotation and reflectivity as a function of the thickness of the magnetic layer having an $SiO_2$ passivation layer over the MnBi film.

FIG. 5 shows the net rotation obtained from the structure just described but with a 250 Å thick $SiO_2$ passivation and phase matching layer added to the top surface of the magnetic layer. A small fraction of SiO is often present in such deposited films, but does not substantially degrade or alter its properties. This passivation layer by itself acts as a partial antireflection coating: the rotation is increased but the reflectivity is decreased. This problem can be avoided by incorporating the passivation layer as the first layer of the MLD overcoating.

Figure 1C:
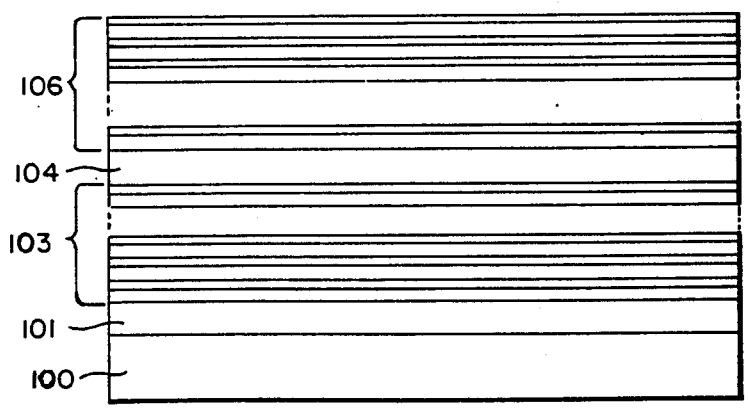
FIG. 1c illustrates a second embodiment of the magnetic mirror of the present invention in which a metal film undercoating is used.
Figure 6:
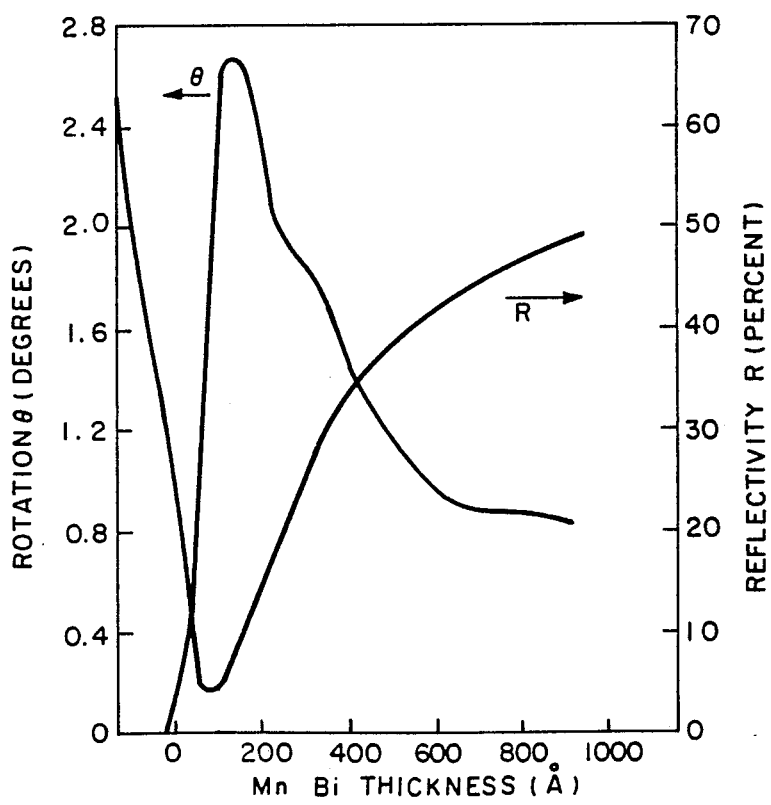
FIG. 6 is a graph of rotation and reflectivity as a function of thickness of the magnetic film for a magnetic mirror employing a metal film undercoating.

MnBi films can also be grown on thin metal films. A passivation layer can be added to the metal film prior to deposition to prevent detrimental alloying or other contamination of the magnetic layer. The measurements of rotation and reflectivity for an aluminum film with a $SiO_2$ passivation-buffer layer are shown in FIG. 6. The enhancement of the rotation is considerably improved, but the reflectivity decreases substantially, resulting in a lower figure of merit for this configuration. This is a consequence of the reflectivity of the aluminum film being not substantially greater than that of the MnBi film. To improve the figure of merit, the structure for a metal based mirror is modified as shown in FIG. 1c, where a substrate 100 supports a metal thin film mirror 101 overcoated with a series of layer pairs 103 of alternating high and low dielectric constant to enhance the reflectivity of the undercoating to be substantially greater than that of magnetic layer 104. A second MLD stack 106 is used to overcoat the magnetic layer 104 to enhance reflections at the top surface.

Referring to FIG. 7, there is shown a diagram of a laser gyroscope system which may use the embodiment of the present invention for a magnetic mirror to advantage. Gyro block 10 forming the frame upon which the system is constructed, supports reflectors 12, 14, 16 and 18 and forms passages 20, 22, 24 and 26. Anodes 32 and 34 are placed in the passages between reflectors 12 and 14, and 16 and 18, respectively, while cathode 30 is placed adjacent passage 22 between mirrors 16 and 14. The passages between the two electrodes 32 and 34 and cathode 30 provide a path for a gas discharge for a laser gain medium comprising a helium-neon gas mixture. A mixture of He, $^{20}$Ne, and $^{22}$Ne in the ratio of 8:0.525:0.475 is preferred, although other mixtures are equally workable. The reflectors are placed at the intersections of the passages. One of these reflectors, such as reflector 12, may be slightly concave to insure the beams are stable and confined substantially to the center of the passages.

Gyro block 10 is preferably constructed with a material having a low thermal coefficient of expansion such as a partially vitrified ceramic material to minimize the effects of temperature change upon a laser gyro system. A preferred commercially available material has been sold under the name of Cervit material C-101 by Owens Illinois Company; alternatively a material sold under the name of Zerodur by Schott Optical Glass, Inc. may be used.

Reflector 14 is a partially transmitting dielectric mirror to allow a portion of each beam traveling along the closed path within the gyro block 10 to be coupled into output optics 38. The structure for output optics 38 is disclosed in U.S. Pat. No. 4,141,651 issued Feb. 27, 1979 to I. Smith et al. and assigned to the present assignee.

The four passages 20, 22, 24 and 26 define a non-planar propagation path for the various beams within the system. For instance, passages 20 and 22 can be considered to lie in a first plane which intersects the plane defined by passages 24 and 26. Each propagating beam then undergoes an image rotation as it passes around a closed path. The non-planar path inherently supports only waves having substantially circular polarization. In the preferred embodiment, the passages and reflectors are so arranged as to provide a substantially 90° image (and polarization) rotation for the various beams. Since beams of right-hand and left-hand circular polarization are rotated, and thus phase shifted, in opposite senses by the same amount, independent of their direction of propagation, a frequency splitting between beams of right- and left-hand circular polarization must occur in order for the beams to resonate within the optical cavity. This is shown in FIG. 2 as the frequency splitting between the beams of left-hand and right-hand circular polarization. The composite gain curve (solid line) is a sum of the dashed single-isotope gain curves. Other amounts of reciprocal phase shift may be used depending upon the frequency separation desired. Polarization rotation will occur as long as the closed propagation path is non-planar. The precise arrangement of the paths will determine the amount of image rotation, phase shift, and frequency separation.

In order to produce a four-frequency gyro, a non-reciprocal or direction-dependent bias also must be provided in the path of the propagating rays. However, it has been found that the four frequencies are not always equally affected by external disturbances, resulting in different variations of the frequencies. Thus, the resultant fluctuations are not fully cancelled in the differential output. Practical application of this instrument has been limited by the presence of such residual thermal sensitivities which are manifested as unacceptable long term bias drift. The residual thermal sensitivities are found to be exacerbated by the presence of any solid material in the optical path. The magnetic mirror of the present invention can then be used advantageously to reduce such residual thermal sensitivity in a gyro system which employs a non-planar gyro path to obtain the reciprocal bias. Thus, in the embodiment of FIG. 7, the nonreciprocal bias is provided by a magnetic mirror 18 which exhibits magneto-optical properties in order to produce a phase shift for a circularly polarized mode of a given handedness propagating in one direction that is different from that of the mode of the same handedness propagating in an opposite direction. The details of this magnetic mirror have been described hereinabove. The result of using the magnetic mirror is that the closed but substantially non-solid beam path now supports waves having four different frequencies as shown in FIG. 2. The nonreciprocal splittings $f_2-f_1$ and $f_4-f_3$ are shown greatly exaggerated for clarity.

Again referring to FIG. 7, there is shown a high-voltage power supply 60 which provides center cathode electrode 30 with a negative voltage and anode electrodes 32 and 34 with a positive voltage. Discharge control electronics 62 for the anodes provides regulation for the current flowing from the two anodes to the cathode.

Path length control 64 is a feedback network which maintains a stable pathlength within the gyro cavity and also centers the four frequencies symmetrically about the peak of the gain curve. The optical pathlength is controlled by means of a piezoelectric transducer 17 which drives mirror 16. Pathlength control 64 derives a signal for operating the high voltage piezoelectric driver 66 from the detector preamplifier 68 which in turn receives signals from the detector diodes that are part of output optics. The output signals from detector diodes have a time average amplitude in proportion to the intensities of the corresponding RCP and LCP modes. Pathlength control 64 generates a difference signal between these two intensity related signals. The pathlength control is fully described in U.S. Pat. No.

4,108,553 to A. Zampiello et al., assigned to the present assignee.

Output optics 38 is disposed adjacent partially transmitting dielectric mirror 14 to separate the circulating waves into beams corresponding to two separate pairs having the same sense of circular polarization in order to produce the two output signals ($f_2-f_1$) and ($f_4-f_3$), which are then processed by signal processor 70 to derive a signal suitable for any required utilization circuitry.

Other modification to the described embodiment will be apparent to persons skilled in the art without departing from the spirit and scope of this invention. Accordingly, it is intended that this invention be not limited except as defined by the appended claims.

What is claimed is:

1. In combination:
    a substrate;
    means for producing a predetermined amount of reflectivity disposed on a surface of said substrate;
    a semi-transparent layer of magneto-optical material disposed over a surface of said reflectivity producing means, said magneto-optical layer having a predetermined thickness;
    means, disposed over a surface of the semi-transparent layer of magneto-optical material, for enhancing the reflectivity of said surface of said magneto-optical layer; and
    wherein the predetermined thickness of the magneto-optical layer is different from the thickness required to provide phase equalization between waves reflected from an outer surface of the reflectivity enhancing means, the surface of the magneto-optical layer and the surface of the reflectivity producing means, with the reflectivity enhancing means and the reflectivity producing means being selected to provide such phase equalization.

2. The combination of claim 1 wherein:
    said reflectivity producing means comprise a multiple layer dielectric stack deposited on said substrate.

3. The combination of claim 1 wherein:
    said reflectivity producing means comprise a metal layer disposed over said substrate and a plurality of alternating dielectric layer pairs disposed over said metal layer.

4. The combination of claim 1 wherein:
    said reflectivity enhancing means comprise a multiple layer dielectric stack.

5. The combination of claim 4 wherein:
    said multilayer dielectric stack comprises alternating layers of ZnS and ThF$_4$.

6. The combination of claim 4 wherein:
    said multilayer dielectric stack comprises alternate layers of TiO$_2$ and SiO$_2$.

7. The combination of claim 1 further comprising:
    means for producing a magnetic field perpendicular to the plane of said magneto-optical layer.

8. The combination of claim 1 wherein:
    said magneto-optical layer comprises a permanently magnetized ferromagnetic material.

9. The combination of claim 8 wherein:
    said ferromagnetic material comprises MnBi magnetized substantially perpendicular to the film plane.

10. The combination of claim 1 wherein:
    said magneto-optical layer comprises a thin film having an optical thickness of less than a quarter wave.

11. The combination of claim 10 further providing:
    means for increasing the apparent optical thickness of said thin film.

12. The combination of claim 11 wherein:
    said reflectivity producing means comprise a multilayer dielectric stack.

13. The combination of claim 12 wherein:
    said thickness increasing means are incorporated into said dielectric stack.

14. The combination of claim 10 wherein:
    the thickness of said magneto-optical layer is approximately 300 Å.

15. The combination recited in claim 1 wherein the reflectivity producing means comprises a plurality of layers of dielectric materials, one of such plurality of dielectric layers having disposed thereon the layer of magneto-optical material, such one of the dielectric layers having a thickness selected to provide a predetermined phase to the waves reflected from the surface of the reflectivity producing means.

16. In combination:
    means for producing a predetermined amount of reflectivity;
    a semi-transparent layer of magneto-optical material disposed over a surface of said reflectivity producing means, waves entering the magneto-optical layer through a first surface thereof propagating through the magneto-optical layer, reflecting from the surface of the reflectivity producing means, re-propagating through the magneto-optical layer and exiting the layer through the first surface, said entering and exiting waves having a predetermined phase shift therebetween, said magneto-optical layer having a predetermined thickness selected to provide said predetermined phase shift;
    means, disposed over the first surface of the semi-transparent layer of magneto-optical material, for enhancing the reflectivity of the first surface of the magneto-optical layer; and
    wherein the reflectivity enhancing means and the reflectivity producing means are selected to equalize the phase between said exiting waves, waves reflected from the first surface of the magneto-optical layer, and waves reflected from an outer surface of the reflectivity enhancing means, with the predetermined thickness of the magneto-optical layer being different from the thickness required to equalize said phase.

* * * * *